W. H. HUNT.
DUMPING TRUCK.
APPLICATION FILED MAR. 12, 1909.
961,861.
Patented June 21, 1910.
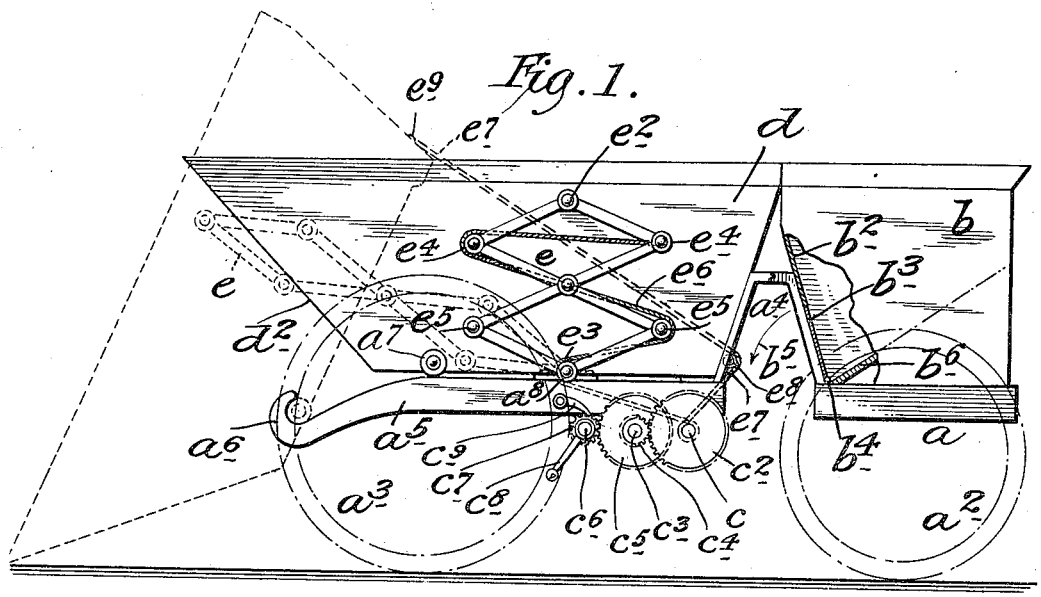
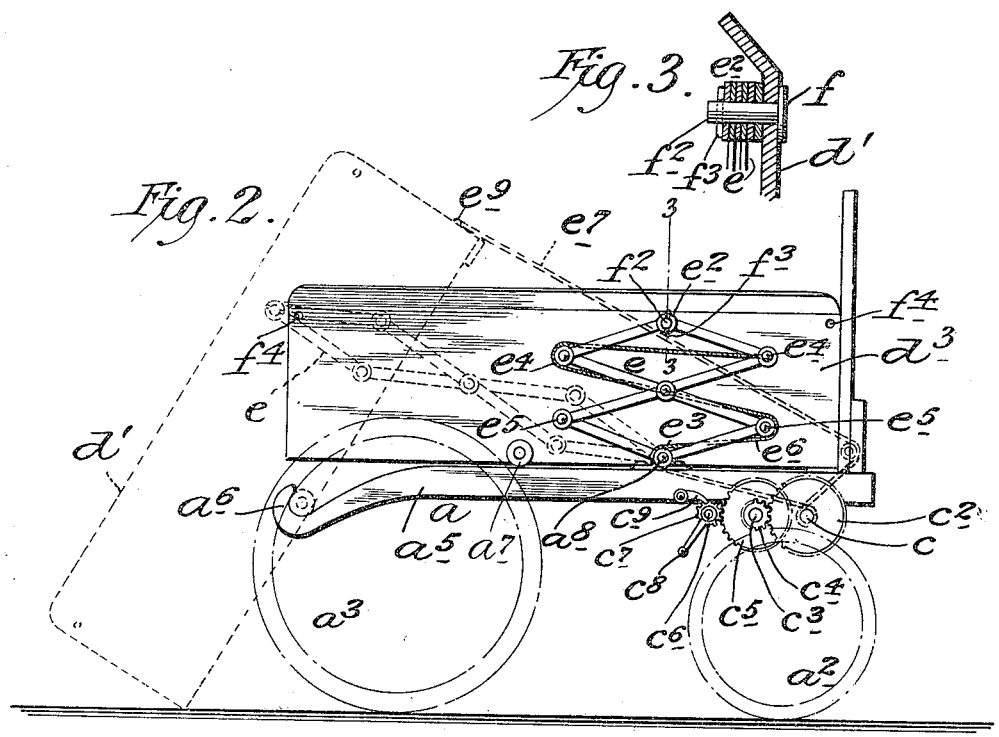
WITNESSES:
INVENTOR
William H. Hunt
BY Edgar Tate
ATTORNEYS.

UNITED STATES PATENT OFFICE.

WILLIAM H. HUNT, OF NEW YORK, N. Y.

DUMPING-TRUCK.

961,861.	Specification of Letters Patent.	Patented June 21, 1910.

Application filed March 12, 1909. Serial No. 483,069.

*To all whom it may concern:*

Be it known that I, WILLIAM H. HUNT, a citizen of the United States, and residing at New York, in the county of New York and State of New York, have invented certain new and useful Improvements in Dumping-Trucks, of which the following is a specification, such as will enable those skilled in the art to which it appertains to make and use the same.

This invention relates to dumping trucks; and the object thereof is to provide an improved device of this class particularly designed for hauling or transporting and dumping coal, bricks, dirt, mortar or other material or substances.

The invention is fully disclosed in the following specification, of which the accompanying drawings form a part, in which the separate parts of my improvement are designated by suitable reference characters in each of the views, and in which—

Figure 1 is a side view of a dumping truck involving my invention, part of the construction being broken away, Fig. 2 a side view of a dumping truck showing a modification of my invention, Fig. 3 a partial section on the line 3—3 of Fig. 2.

In the practice of my invention as shown in Fig. 1, I provide a dumping truck or vehicle comprising a truck frame $a$ and the usual running gear, the running gear with the exceptions of the front wheels $a^2$ and rear wheels $a^3$ being not shown or indicated.

The truck frame $a$ is provided rearwardly of the front wheels $a^2$ with a U-shaped raised portion $a^4$ forwardly of which is placed a body member $b$, the back wall $b^2$ of which is inclined upwardly and backwardly and provided with a door $b^3$ hinged at the bottom $b^4$ and adapted to open backwardly and downwardly as indicated by the arrow $b^5$, and the bottom portion of the body member $b$ is preferably inclined upwardly and forwardly as shown at $b^6$.

The door $b^3$ may be provided with any preferred means for holding it closed, and by opening said door the contents of the body member $b$ may be dumped backwardly and downwardly as will be readily understood.

Beneath the central portion of the truck frame is mounted a transverse shaft $c$ having a gear wheel $c^2$ at one end, and rearwardly of the shaft $c$ and parallel therewith is another shaft $c^3$ provided with a pinion $c^4$ which meshes with the wheel $c^2$, and said shaft $c^3$ is also provided with a gear wheel $c^5$, and rearwardly of the shaft $c^3$ is a crank shaft $c^6$ provided with a pinion $c^7$ which meshes with the gear wheel $c^5$, and the said shaft $c^6$ is provided with a crank $c^8$ by which it may be turned, and a pawl $c^9$ is pivoted to the truck frame above the pinion $c^7$ and adapted to operate in connection therewith so as to prevent the backward movement of the shaft $c^6$.

On the rear portion of the truck frame is placed a bed or body member $d$, the rear end part of which is preferably inclined upwardly and backwardly as shown at $d^2$, and the side bars $a^5$ of the truck frame are extended backwardly and downwardly and provided with upwardly curved hook members $a^6$, and the rear end portion of the bed or body member $d$ is provided with rollers $a^7$ adapted to travel on the side bars $a^5$ of the truck frame as will be readily understood and to rest in the hooks $a^6$.

Pivoted to the truck frame at $a^8$ and at the opposite sides thereof are double diamond-shaped lazy-tongs $e$, only one of which is shown, and the members of which have top and bottom connection $e^2$ and $e^3$, and the top member of which has lateral connections $e^4$, and the bottom member of which is provided with lateral connections $e^5$, and said lazy-tongs are also pivotally connected at $e^2$ with the bed or body member $d$, and the rear pivotal connections at $e^4$, and the front pivotal connections at $e^5$, and the pivotal connections at $e^3$ are provided with rollers around which are passed cables $e^6$, but one of which is shown, and the cables $e^6$ are connected with the pivotal lazy-tongs's front connections at $e^4$ and passed around rollers at the rear pivotal connections $e^4$, and then forwardly and around the rollers at the front pivotal connections at $e^5$, and then downwardly and backwardly around the rollers at $a^8$, and then forwardly and secured to the shaft $c$, and another cable $e^7$ is connected with the shaft $c$ and passed around a roller $e^8$ supported in the truck frame at the front of the body member $d$, and said cable $e^7$ is connected with the front end portion of the body member $d$ at $e^9$.

It will be understood from the foregoing description that the lazy-tongs $e$ and the cables $e^6$ are duplicated at the opposite side of the body member $d$, and but one of the cables $e^7$ is necessarily employed, but two may be employed if desired, in which event one will be at each side of the body member $d$.

In the operation of this form of construction, in order to dump the contents of the body member $d$, the shaft $c^6$ is turned to the right by means of the crank $c^8$. In this operation the lazy-tongs $e$ at the opposite sides of the body member $d$ are raised and the cable $e^7$ is unwound from the shaft $c$.

The rear end portion of the body member $d$ is heavier than the front end portion, or that portion forwardly of the pivotal connection at $a^3$ of the lazy-tongs, and as the body member $d$ is raised it also moves backwardly, the rollers $a^7$ riding on the rear end portions of the side bars $a^5$ of the truck frame, and in the same operation said rollers move downwardly into the hook members $a^6$, and the bed or body member $d$ assumes the position shown in dotted lines and the contents thereof are dumped as will be readily understood.

In order to return the bed or body member $d$ to the position shown in full lines in Fig. 1, the pawl $c^9$ is raised and the shaft $c^6$ is turned in the opposite direction, and in this operation the lazy-tongs $e$ are gradually returned to their normal position as the cable $e^7$ draws the body member $d$ back into its normal position, or that shown in full lines in Fig. 1.

It will be understood that the cables $e^6$ and $e^7$ are wound in opposite directions on the shaft $c$, and the construction shown in Fig. 2 is the same as that shown in Fig. 1 except that but one body $d^3$ is employed and the winding mechanism which operates the lazy-tongs $e$ is placed forward of the position shown in Fig. 1, the bed or frame-work of the truck is horizontal and is not provided with the upwardly directed U-shaped part $a^4$ shown in Fig. 1, and the lazy-tongs connection with the bed or body $d^3$ at $e^2$ is made as shown in Fig. 3, by means of a plate $f$ having an outwardly directed pin $f^2$ which forms the pivot for the lazy-tongs and is provided with a cotter pin $f^3$, and by means of this construction the lazy-tongs may be disconnected from the body $d^3$ and said body may be lifted bodily from the truck whenever desired and for any purpose, and the top part of the body $d^3$ is provided at opposite ends thereof with rings, eyes or apertures $f^4$ which will serve as connections for a suitable hoisting apparatus by means of which the body may be raised or removed from the truck.

Having fully described my invention, what I claim as new and desire to secure by Letters Patent, is:—

In a dump cart or vehicle, a truck frame the sides of which are provided with backwardly and downwardly curved extensions having hook members at their ends, a bed or body mounted thereon and provided with rollers which bear on the sides of the truck frame and are adapted to move downwardly and backwardly on said extensions and to rest in said hook members, lazy-tong devices pivoted to the truck frame at the opposite sides of said bed or body and to the opposite sides of said bed or body, a winding mechanism mounted beneath the bed or body, cables connected with the lazy-tongs and with said winding mechanism, another cable connected with the front end of the bed or body and passed around a roller at the front end of the truck frame and connected with said winding mechanism whereby when said winding mechanism is operated in one direction the front end portion of the bed or body will be raised and said bed or body moved backwardly and downwardly and turned into a dumping position, and when said winding mechanism is operated in the other direction said bed or body will be turned back into its normal position on the truck frame.

In testimony that I claim the foregoing as my invention I have signed my name in presence of the subscribing witnesses this 11th day of March 1909.

WILLIAM H. HUNT.

Witnesses:
C. E. MULREANY,
H. R. CANFIELD.